Patented Oct. 13, 1942

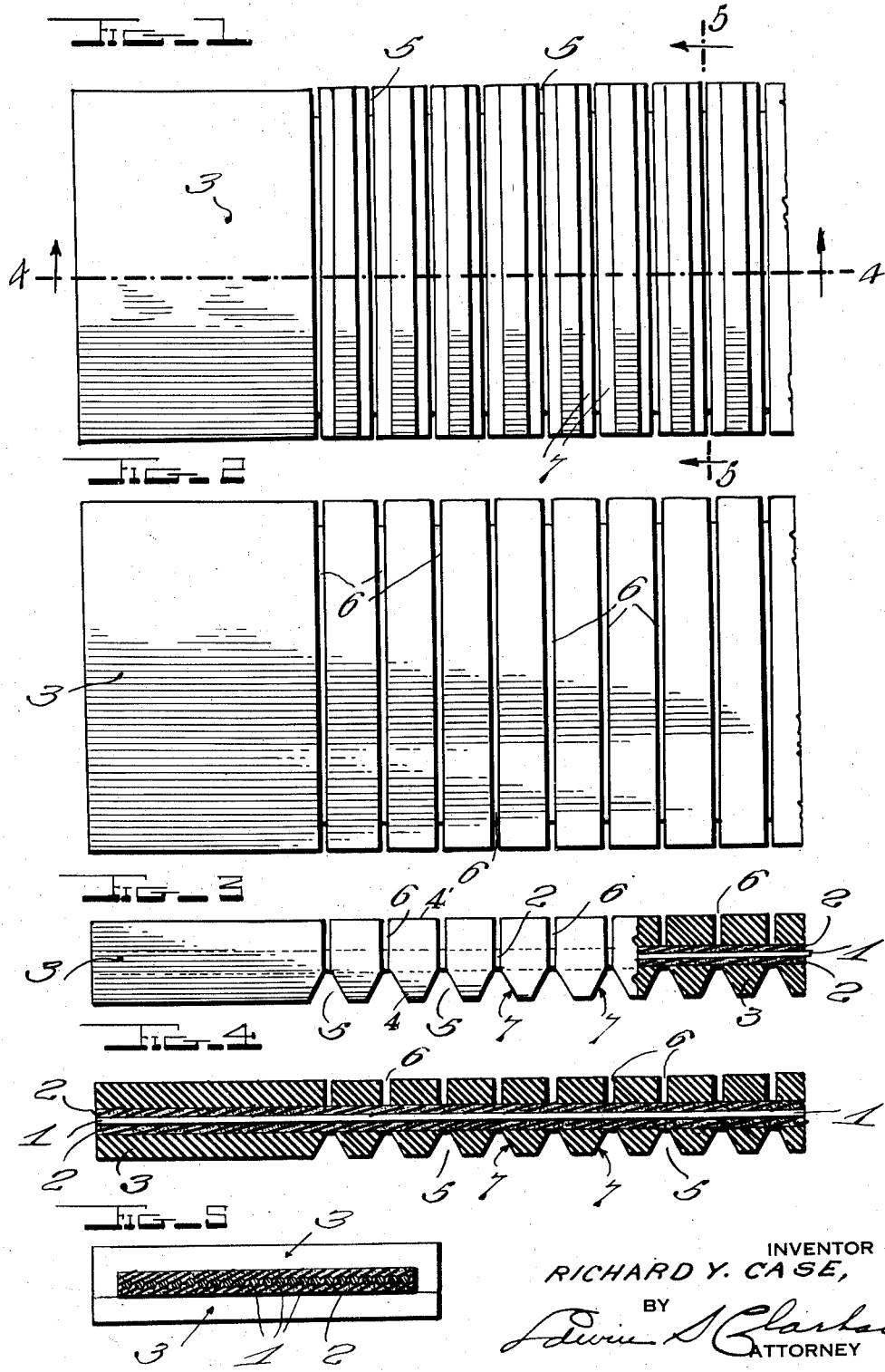

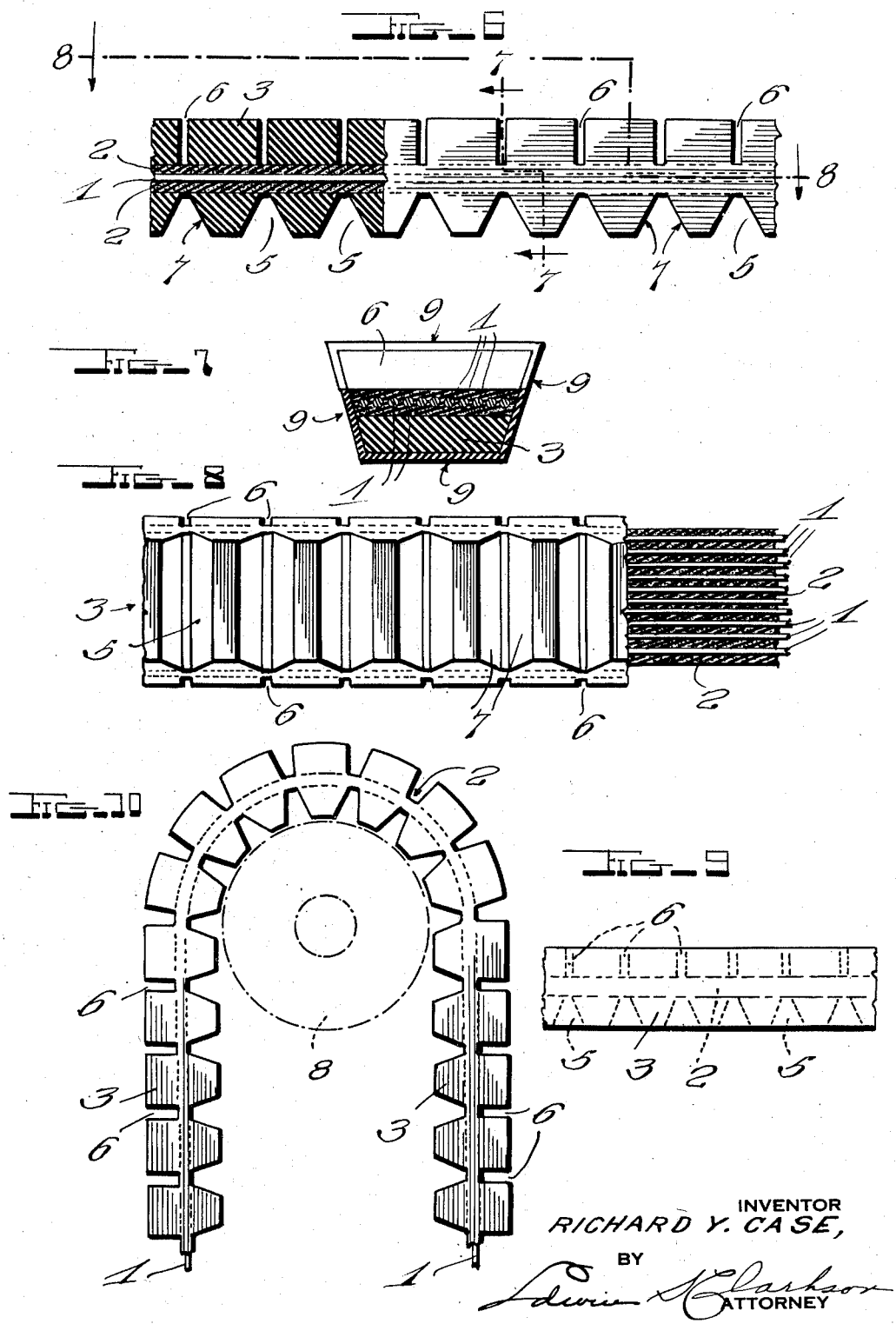

2,298,867

UNITED STATES PATENT OFFICE 2,298,867

METHOD OF MAKING CUT TOOTHED POWER TRANSMISSION BELTS

Richard Y. Case, Philadelphia, Pa., assignor to L. H. Gilmer Co., Philadelphia, Pa., a corporation of New Jersey Application March 13, 1941, Serial No. 383,236

2 Claims. (Cl. 154—4)

In V belts, as heretofore made, the side driving walls of the belt bulge in contacting the walls of the pulley whereby the said walls wear unevenly. The friction on these bulging walls is so great that the excessive heat thereby generated has resulted in explosions in the belt, as a result of which the belt is useless.

The primary object of my invention is to provide a method of making a power transmission belt which, regardless of its diameter, is adapted to run smoothly over pulleys of various diameter.

Another object of my invention is to provide a method of making a toothed belt in which the end walls of the teeth do not bulge when engaging the pulley over which it is moving, thereby retaining a firm continuous contact from top to bottom with the end walls of the belt.

Another object of my invention is to provide a method of making a cut toothed power transmission belt adapted to be used on a flat or V-shaped pulley.

Another object of my invention is to provide a method of making a power transmission belt comprising a plurality of cut teeth and a pulley, or neutral axis section, said section being molded and vulcanized with said teeth.

In the drawings:

Figure 1 is a bottom plan view, the left hand portion of which shows the belt body as originally molded and vulcanized, the right hand portion showing teeth cut from said body.

Figure 2 is a top plan view of Figure 1.

Figure 3 is a side elevation of Figure 2, portions being in section.

Figure 4 is a sectional view on the line 4—4, Figure 1.

Figure 5 is a sectional view on the line 5—5, Figure 1.

Figure 6 is a side elevation of a modified form of the belt partially in section.

Figure 7 is a sectional view on the line 7—7, Figure 6.

Figure 8 is a sectional view on the line 8—8, Figure 6.

Figure 9 is a vertical longitudinal section of the belt showing in dotted lines where cuts are to be made in the belt body to form the teeth.

Figure 10 shows the belt applied to a pulley.

The belt, according to my invention, is moulded as shown in Figure 5 which is a transverse sectional view.

The pulling cable cords are designated by the reference numeral 1 of which there may be one or a plurality of layers, according to the work the belt is designed for. The cords are rubberized, or otherwise suitably treated prior to their application in the belt, and they constitute the neutral axis and pulling section of the belt.

The cords 1 are then embedded in a mass of comparatively soft rubber 2, which entirely surrounds the cords, as shown, to prevent friction between the cords and to enable the cords to readily bend around a pulley.

The cords 1 and soft rubber 2 are then enclosed in a casing, or cover, 3, of a material designed to vulcanize hard, or comparatively hard; thus after the assembly of the parts shown in the drawing is properly vulcanized it becomes a substantially rigid structure, which is practically non-flexible throughout its length. It will be understood, of course, that the structure thus formed may be endless, or in lengths, as desired.

After the body is thus formed and vulcanized it is separated into teeth 4 along one side of the belt and blocks 4' along the opposite side of the belt on the dotted lines 5 and 6, as shown in Figure 9, by cutting in any way found most desirable, but the cutting stops short of the neutral axis structure of soft rubber 2 and cords 1, as clearly shown in the drawings. In other words, the cuts 5 in the side walls terminate at the side edges of the neutral axis structure, while the cuts 6 terminate in the plane of the upper end lower face of the neutral axis structure whereby the body is separated into cut teeth and blocks throughout its length, while the neutral axes structure remains continuous and integral throughout the belt.

This improved belt may be constructed as a flat belt, as shown in Figures 1, 2, 3, 4 and 5, and if desired may be formed as an endless substantially V-shaped belt, as shown in Figures 6, 7, 8, 9 and 10.

In both the flat and V belt the cuts from the bottom face of the belt are inclined as at 7, thereby eliminating crowding or contact between the teeth while passing over the pulley 8, as shown in Figure 10.

In the V belt structure I may cover the belt body in a rubberized wrapper 9.

In all forms of belt, according to my invention, the teeth are hard and non-flexible, whereby the belt is rendered highly durable and whereby the sides of the blocks and the ends of the teeth are prevented from bulging when contacting with the walls of the groove in a pulley, thereby insuring a firm continuous contact from top to bottom of each tooth, in a V belt with the walls of the groove of the pulley, thus materially reducing, if not entirely eliminating, the generation of heat in the belt experienced in the V belts as heretofore constructed, thus prolonging the life of the belt. Thus the compression and tension sides of the belt formed respectively by the blocks and the teeth are hard and incompressible and inexpansible so as to provide a belt which is adapted for long wear and incapable of distortion in the manner mentioned, whereby the noted objections to prior belts are avoided. In this belt, as each hard and incompressible tooth is arranged opposite to and in transverse alinement with a hard and incompressible block-like member, the belt can flex solely along the lines between adjacent pairs of blocks and teeth, so that the belt is adapted to run smoothly over pulleys of various diameters without bulging and becoming overheated.

What I claim is:

1. The method of making a cut toothed power transmitting belt, which consists in forming an elastic neutral zone section comprising one or more rows of inextensible pull cords invested in a soft rubber body, enclosing the top, bottom, and sides of said neutral zone section in a surrounding casing formed of a vulcanizable material, then vulcanizing the casing to a degree such as to render the same relatively hard and inflexible against compression or expansion, and then transversely dividing the casing so as to form a continuous series of block-like members on the tension side of the neutral zone section and so as to form a continuous series of projecting teeth on the compression side of the neutral zone section, each tooth being arranged in transverse alinement with a companion block member and integral therewith so as to be entirely separated from the adjacent teeth by the intervening transverse divisions to adapt the belt to flex solely upon the neutral zone section on lines between adjacent pairs of companion teeth and block sections.

2. The method of making a V-type cut toothed power transmitting belt, which consists in forming an elastic neutral zone section comprising one or more rows of inextensible pull cords invested in a soft rubber body, enclosing the top, bottom, and sides of said neutral zone section in a surrounding casing formed of a vulcanizable material, then vulcanizing the casing to a degree to render the same relatively hard and inflexible against compression or expansion, and then transversely dividing the casing on the tension side of the neutral zone section so as to form a continuous series of block-like members and transversely dividing the casing on diverging lines on the compression side of the neutral zone section so as to form a continuous series of V-shaped teeth, each tooth being arranged in transverse alinement with a companion block member and integral therewith and entirely separated from adjacent teeth by the intervening divisions so as to adapt the belt to flex solely upon the neutral zone section on lines between adjacent pairs of teeth and block sections.

RICHARD Y. CASE.